Sept. 8, 1925.
C. GIRL
AUTOMOBILE BUMPER
Filed Dec. 21, 1923
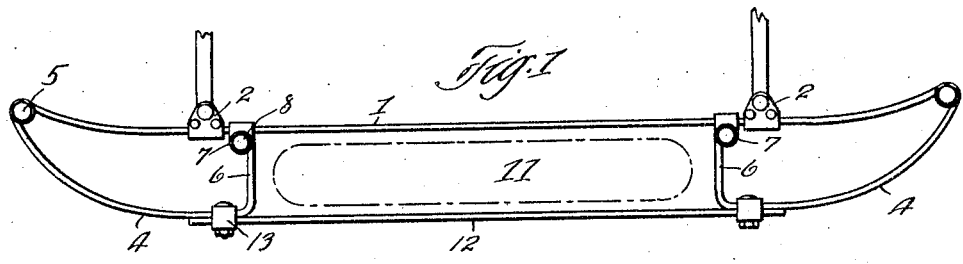
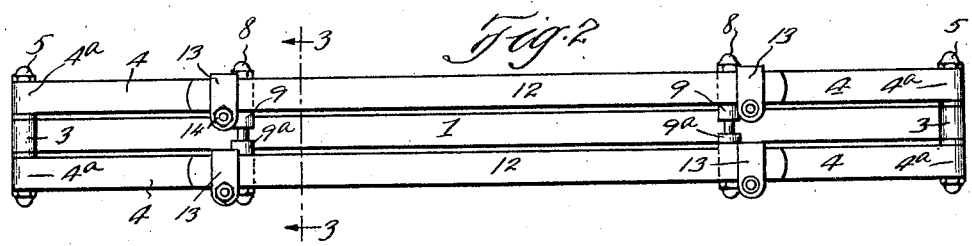
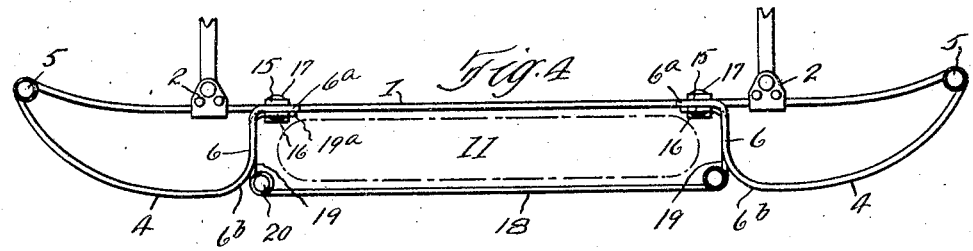
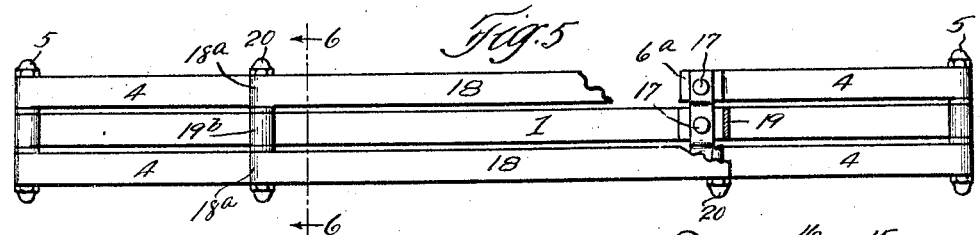
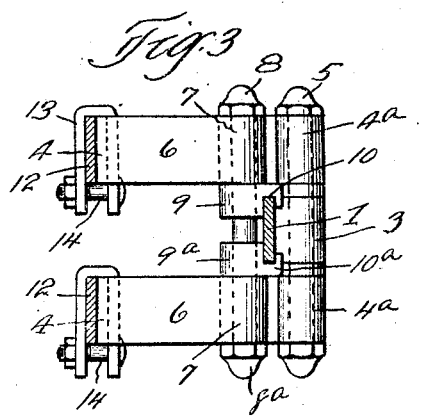
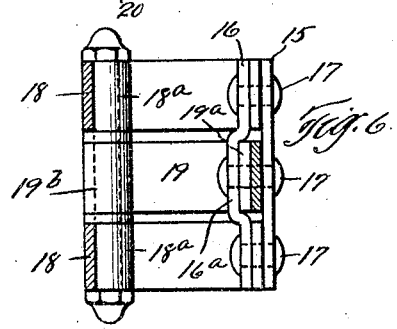
Inventor
Christian Girl,
By Hull, Buck & West,
Attys.

Patented Sept. 8, 1925.

1,553,231

UNITED STATES PATENT OFFICE.

CHRISTIAN GIRL, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed December 21, 1923. Serial No. 681,911.

*To all whom it may concern:*

Be it known that I, CHRISTIAN GIRL, a citizen of the United States, residing at Detroit, in the county of Wayne and State of Michigan, have invented a certain new and useful Improvement in Automobile Bumpers, of which the following is a full, clear, and exact description, reference being had to the accompanying drawings.

This invention relates to automobile bumpers, and more particularly to bumpers which are adapted to be applied to the rear of such vehicles for the purpose of protecting the fenders thereof and to receive and permit convenient handling of a spare tire associated therewith.

In the construction shown herein, the end sections of the bumper are projected rearwardly so as to cover and protect the fenders with which they cooperate, and are preferably made of several bars or plates, the intermediate section which connects the end sections being offset forwardly, or toward the vehicle, with reference to the end sections and providing, between such rearwardly projecting sections, a space or pocket for the reception of a spare tire, together with means movably connected with such bumper for covering rearwardly the space or pocket within which the tire is located.

In the drawings forming part hereof, Fig. 1 represents a plan view and Fig. 2 an elevation of a bumper embodying the invention; Fig. 3 a sectional detail corresponding to the line 3—3 of Fig. 2; Figs. 4 and 5 views, similar to Figs. 1 and 2, respectively, showing a modified form of the invention; and Fig. 6 a sectional detail corresponding to the line 6—6 of Fig. 5.

For convenience of description, the bumper will be assumed to be in the position which it occupies when applied to the rear end of an automobile, and the terms "front" and "rear" will be used accordingly but without any intention of necessarily limiting the application of the bumper to any particular part of the vehicle.

Describing the parts by reference characters and in connection with Figs. 1–3 inclusive, 1 denotes a continuous bar adapted to extend across the rear of an automobile and the fenders thereof and to be supported in any convenient manner from the rear ends of the side members of the vehicle, as by clamps 2, adjustably mounted upon such bar. The ends of the bar are curved forwardly, or toward the vehicle, and are provided each with an eye 3. 4, 4 denote upper and lower bars, each having an eye $4^a$ at one end, and adapted to be connected to the corresponding end of the bar 1 by means of a bolt 5 extending through the aligned eyes, the eye 3 being interposed between the eyes on the ends of the bars 4.

The bars 4 project rearwardly with respect to the bar 1 and are then bent forwardly or toward the bar 1, as indicated at 6, the extreme inner ends of the bars 4 being located above and below the bar 1 respectively, and preferably terminating, adjacent to and at the rear of the bar 1, each with an eye 7. The eyes 7 are secured to the bar 1 by means of a bolt 8 extending through said eyes and through a pair of symmetrical clamping members 9, $9^a$, the former being adapted to engage the lower edge of the upper bar 4 and the latter being adapted to engage the upper edge of the lower bar 4, each clamping member being provided with a recessed seat 10, $10^a$, respectively, adapted to engage the top and bottom edges of the bar 1. It will be evident that, by setting up the nut $8^a$ on the bolt 8, the parts 6 of the bars 4 will be forced toward each other, thereby forcing the clamping members 9 and $9^a$ into close engagement with the top and bottom edges of the bar 1, with the result that the parts will be securely clamped together.

The construction shown in Fig. 3 is duplicated at the opposite end of the bumper structure, and the parts of such end are designated by the same reference characters as are applied to the parts just described.

A bumper constructed in the manner disclosed herein is provided with exceedingly strong end sections which extend across and efficiently protect their respective fenders. The bars 4 are offset rearwardly from the bar 1 a sufficient distance and are of such length as to provide a space between the parts 6 within which a spare tire, indicated at 11, may be placed and supported in any desired manner and preferably with its rearwardly-presented surface within the pocket formed by the intermediate portion of the bar 1 and the portions 6 of the bars 4.

A pair of rear intermediate bars 12 are secured to the bars 4, extending across the space between the parts 6 of the latter bars.

The bars 12 may be conveniently secured to the bars 4 by means of U-shaped clamps 13, applied to the bars 4, outside the portions 6 thereof, and to the ends of the bars 12. These clamps extend below their respective bars 4 and 12 and are there provided with bolts 14 adapted to engage the bottom edges of said bars. The bars 12 constitute an intermediate movably-supported rear section of the bumper, which strengthens the central or intermediate portion of the bumper assembly and protects the tire from injury.

In Figs. 4–6 inclusive, there is shown a modification of the invention wherein the intermediate and end sections are substantially identical with those illustrated in Figs. 1–3 inclusive, the only difference as to such bumper construction being that the ends of the portions 6 of the bars 4 are bent at substantially right angles, as shown at 6ª, into the vertical plane of the bar 1, being secured to such bar by means of clamping plates 15, 16 and bolts or rivets 17.

The tire 11 is enclosed within the pocket formed between the parts 1 and 6 and is protected against blows or impacts by means of a section consisting of a gate-like extension of the end sections 4, said extension comprising a pair of bars 18, spaced apart vertically and arranged to form one a continuation of the upper, and the other a continuation of the lower, bar 4. The ends of this gate-like extension are supported by means of plates or bars 19 each having an end 19ª adapted to be secured to the plate 1, and preferably by the clamping plates 15 and 16 and intermediate rivets 17, one of the plates (16) being offset at its central portion, as indicated at 16ª, to accommodate such end 19ª, being riveted thereto by the intermediate rivet 17. Each bar or plate 19 is provided with an eye 19ᵇ at its outer end, said eye being located adjacent to the outwardly bent portions 6ᵇ of the bars 4.

Each of the plates 18 is provided with an eye 18ª at each end thereof, adapted to register with the eye 19ᵇ on the end of the appropriate bar or plate 19. Bolts 20, similar to the bolts 5 and 8, extend through the eyes 18ª and 19ᵇ and detachably secure the central gate-like section of the bumper in place.

When it is desired to obtain access to the tire 11 either of the bolts 20 may be removed and the bars 18 swung about the other bolt as a pivot; or, if desired, both bolts may be removed and the central section comprising the parts 18, 18ª can be entirely removed.

Having thus described my invention, what I claim is:—

1. An automobile bumper comprising rearwardly projecting end sections each adapted to extend across a fender and an intermediate section forming a pocket with such end sections for the reception of a tire, one or more bars extending across the space between such end sections, and means movably connecting one end of each such bar or bars to the bumper structure.

2. An automobile bumper comprising a pair of end sections each adapted to overhang and protect a fender, an intermediate offset section forming a pocket with such end sections for the reception of a tire, one or more bars extending across the space between such end sections, and means movably supporting such bar or bars.

3. A bumper comprising end sections adapted to overhang and protect the fenders of an automobile, an intermediate section providing with such end sections a space or pocket adapted to receive a tire, and a rear section adapted to extend across and protect such tire, and connected to the end sections.

4. A bumper comprising end sections adapted to overhang and protect the fenders of an automobile, an intermediate section offset forwardly from the rear surfaces of such end sections and forming therewith a pocket for the reception of a tire, and one or more bars extending substantially across such space or pocket and movably connected to such end sections.

5. A bumper comprising end sections adapted to overhang and protect the fenders of an automobile, an intermediate section providing with such end sections a space or pocket adapted to receive a tire, and a movably supported rear section extending substantially across such space or pocket.

6. An automobile bumper comprising rearwardly bowed end sections each adapted to extend across a fender of an automobile and an intermediate bar connecting such end sections and offset forwardly from the rear surfaces of such end sections, and one or more bars each movably supported at one end of the bumper structure adjacent to one of such end sections and extending toward and secured adjacent to the other end section.

7. A bumper comprising a pair of end sections adapted to overhang and protect the fenders of an automobile and each having a pair of vertically spaced rearwardly projecting bars secured together at their ends, said sections providing therebetween a space or pocket for the reception of a tire, and a pair of bars extending across such space or pocket and movably connected to the bars of the end sections.

8. A bumper comprising a pair of end sections, adapted to overhang and protect the fenders of an automobile and each having a pair of vertically spaced rearwardly projecting bars secured together at their outer ends, said sections providing therebetween a space or pocket for the reception of a tire, and a pair of bars extending substantially across such space or pocket, in line with the first mentioned bars, and means supporting the last mentioned bars.

9. A bumper comprising a bar adapted to extend across the end of an automobile and overhang the fenders thereof, pairs of rearwardly projecting bars secured at their outer ends to the outer ends of the first mentioned bar and at their inner ends to intermediate portions of such bar and forming therebetween and with the first mentioned bar a pocket or space for the reception of a tire, and a pair of bars extending substantially across such space or pocket and constituting in effect a continuation of the rearwardly bent bars and movably secured in place.

In testimony whereof, I hereunto affix my signature.

CHRISTIAN GIRL.